(12) United States Patent
Pinto et al.

(10) Patent No.: US 10,649,667 B2
(45) Date of Patent: May 12, 2020

(54) MITIGATING GC EFFECT IN A RAID CONFIGURATION

(71) Applicant: Samsung Electronics Co., Ltd., Suwon-si, Gyeonggi-do (KR)

(72) Inventors: Oscar Pinto, San Jose, CA (US); Sreenivas Krishnan, Campbell, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 53 days.

(21) Appl. No.: 15/713,589

(22) Filed: Sep. 22, 2017

(65) Prior Publication Data

US 2018/0011641 A1 Jan. 11, 2018

Related U.S. Application Data

(63) Continuation of application No. 15/001,217, filed on Jan. 19, 2016, now Pat. No. 9,804,787.

(60) Provisional application No. 62/250,416, filed on Nov. 3, 2015.

(51) Int. Cl.
*G06F 12/00* (2006.01)
*G06F 13/00* (2006.01)
*G06F 3/06* (2006.01)

(52) U.S. Cl.
CPC .......... *G06F 3/0611* (2013.01); *G06F 3/0652* (2013.01); *G06F 3/0659* (2013.01); *G06F 3/0688* (2013.01)

(58) Field of Classification Search
CPC .............. G06F 12/0246; G06F 3/0679; G06F 2212/7205; G06F 3/0688; G06F 3/0619
USPC ......................................................... 711/102
See application file for complete search history.

(56) References Cited

U.S. PATENT DOCUMENTS

| | | | |
|---|---|---|---|
| 5,933,847 A * | 8/1999 | Ogawa ................ | G06F 12/0246 711/103 |
| 8,200,887 B2 | 6/2012 | Bennett | |
| 8,521,972 B1 | 8/2013 | Boyle et al. | |
| 8,713,268 B2 * | 4/2014 | Dillow ................. | G06F 11/108 711/114 |
| 8,799,561 B2 | 8/2014 | Bux et al. | |
| 8,850,114 B2 * | 9/2014 | Rosenband .......... | G06F 3/0613 711/114 |
| 8,898,376 B2 | 11/2014 | Aune | |
| 9,021,336 B1 * | 4/2015 | Northcott ............ | G06F 11/1068 714/752 |
| 9,229,854 B1 * | 1/2016 | Kuzmin ................ | G06F 8/654 |
| 9,361,047 B2 | 6/2016 | Biederman et al. | |
| 9,792,172 B2 * | 10/2017 | Kanno ................ | G06F 11/1008 |
| 9,804,787 B2 * | 10/2017 | Pinto ..................... | G06F 3/0611 |
| 9,830,079 B2 * | 11/2017 | Kanno ................. | G06F 3/0604 |

(Continued)

*Primary Examiner* — Sheng Jen Tsai
(74) *Attorney, Agent, or Firm* — Renaissance IP Law Group LLP

(57) ABSTRACT

A system and method for managing garbage collection in Solid State Drives (SSDs) in a Redundant Array of Independent Disks (RAID) configuration, using a RAID controller is described. A control logic can control read and write requests for the SSDs in the RAID configuration. A selection logic can select an SSD for garbage collection. Setup logic can instruct the selected SSD to enter a garbage collection setup phase. An execute logic can instruct the selected SSD to enter and exit the garbage collection execute phase.

23 Claims, 13 Drawing Sheets

(56) References Cited

U.S. PATENT DOCUMENTS

| | | | |
|---|---|---|---|
| 2008/0034174 A1* | 2/2008 | Traister | G06F 12/0246 711/159 |
| 2008/0034175 A1* | 2/2008 | Traister | G06F 12/0246 711/159 |
| 2008/0162787 A1* | 7/2008 | Tomlin | G06F 12/0246 711/103 |
| 2011/0154356 A1* | 6/2011 | Fareed | G06F 11/3423 718/105 |
| 2012/0096217 A1* | 4/2012 | Son | G06F 12/0246 711/103 |
| 2012/0151124 A1* | 6/2012 | Baek | G06F 12/0246 711/103 |
| 2012/0159051 A1* | 6/2012 | Hida | G06F 3/0611 711/103 |
| 2013/0019057 A1* | 1/2013 | Stephens | G06F 11/108 711/103 |
| 2013/0191601 A1* | 7/2013 | Peterson | G06F 12/0868 711/137 |
| 2013/0205181 A1* | 8/2013 | Blaum | G06F 11/1076 714/763 |
| 2014/0032817 A1* | 1/2014 | Bux | G06F 12/0246 711/103 |
| 2014/0208046 A1* | 7/2014 | Baryudin | G06F 3/0605 711/159 |
| 2014/0215129 A1* | 7/2014 | Kuzmin | G06F 12/0246 711/103 |
| 2014/0281143 A1* | 9/2014 | Shivashankaraiah | G06F 12/0253 711/103 |
| 2015/0113206 A1* | 4/2015 | Fitzpatrick | G06F 12/0246 711/103 |
| 2015/0134876 A1* | 5/2015 | Kim | G06F 3/061 711/102 |
| 2015/0212752 A1* | 7/2015 | Nemazie | G06F 11/108 711/103 |
| 2015/0325315 A1* | 11/2015 | Rakitzis | G06F 11/2094 714/6.31 |
| 2015/0347025 A1* | 12/2015 | Law | G06F 3/0611 711/103 |
| 2015/0347295 A1* | 12/2015 | Ihm | G06F 12/0253 711/103 |
| 2016/0011935 A1* | 1/2016 | Luby | G06F 3/0617 714/6.2 |
| 2016/0011936 A1* | 1/2016 | Luby | G06F 3/0617 714/6.2 |
| 2016/0011939 A1* | 1/2016 | Luby | G06F 11/1076 714/764 |
| 2016/0092309 A1* | 3/2016 | Gao | G06F 11/108 714/6.23 |
| 2016/0117251 A1* | 4/2016 | Lin | G06F 3/0613 711/129 |
| 2016/0124673 A1* | 5/2016 | Feng | G06F 12/0802 711/113 |
| 2016/0124847 A1* | 5/2016 | Malwankar | G06F 12/0253 711/103 |
| 2016/0162205 A1* | 6/2016 | Grimsrud | G06F 3/0616 711/103 |
| 2016/0179403 A1* | 6/2016 | Kurotsuchi | G06F 3/0617 711/114 |
| 2016/0188410 A1* | 6/2016 | Lee | G06F 11/1044 714/6.24 |
| 2016/0188461 A1* | 6/2016 | Takabatake | G06F 12/0253 711/103 |
| 2016/0196216 A1* | 7/2016 | Lee | G06F 3/0604 711/170 |
| 2016/0239412 A1* | 8/2016 | Wada | G06F 12/0246 |
| 2016/0266792 A1* | 9/2016 | Amaki | G06F 12/0246 |
| 2016/0313943 A1* | 10/2016 | Hashimoto | G06F 3/061 |
| 2017/0004077 A1* | 1/2017 | Liu | G06F 12/0253 |
| 2017/0024137 A1* | 1/2017 | Kanno | G06F 3/0604 |
| 2017/0024276 A1* | 1/2017 | Kanno | G06F 11/1008 |
| 2017/0033806 A1* | 2/2017 | Arslan | H03M 13/356 |
| 2017/0046256 A1* | 2/2017 | Horspool | G06F 12/0253 |
| 2017/0052719 A1* | 2/2017 | Boitei | G06F 3/0619 |
| 2017/0068456 A1* | 3/2017 | Toge | G06F 3/0605 |
| 2017/0123974 A1* | 5/2017 | Yi | G06F 12/0253 |

* cited by examiner

MITIGATING GC EFFECT IN A RAID CONFIGURATION

RELATED APPLICATION DATA

This application is a continuation of U.S. patent application Ser. No. 15/001,217, filed Jan. 19, 2016, now allowed, which claims the benefit of U.S. Provisional Patent Application Ser. No. 62/250,416, filed Nov. 3, 2015, both of which are hereby incorporated by reference.

FIELD

This inventive concept relates to Redundant Array of Independent Disks (RAID) configurations, and more particularly to performing garbage collection in a RAID using Solid State Drives (SSDs).

BACKGROUND

Workloads that run on Solid State Drives (SSDs) are diverse, but many have real-time requirements. On-Line Transaction Processing (OLTP) is an example workload which is highly latency sensitive. For such applications, it is imperative that the latency of responses from the storage subsystem be as low as possible and time-bounded, so as not to exceed a few milliseconds. However, erase operations due to garbage collection (GC) in SSDs get in the way of achieving this requirement. This problem is referred to as the "tail latency problem," where the end user is noticeably impacted even if a very small percentage (much less than 1%) of the reads suffers unduly large latencies.

A need remains for a way to minimize the impact of garbage collection operations on other operations of an SSD.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Figure 1:
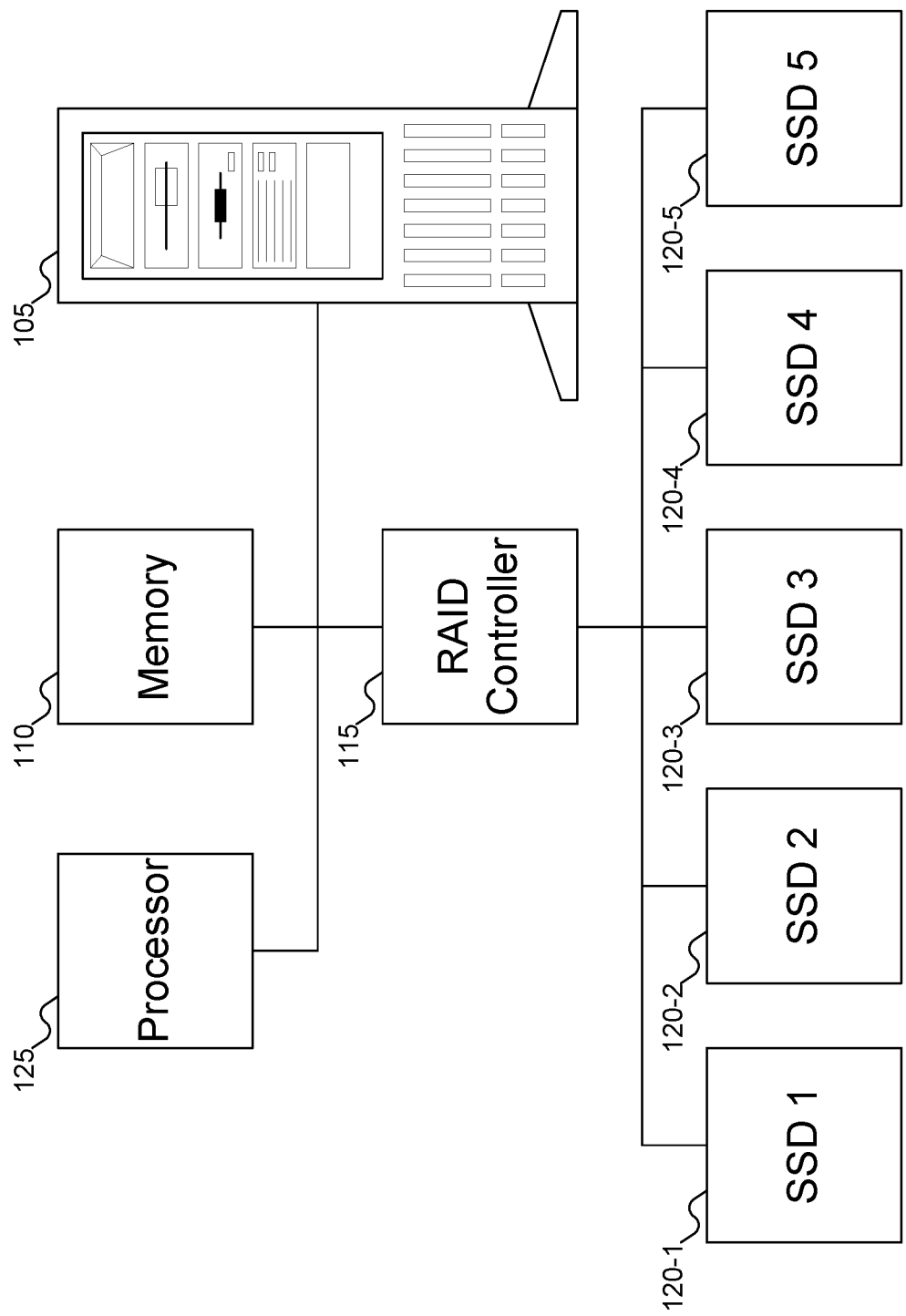
FIG. 1 shows a server including various Solid State Drives (SSDs) in a Redundant Array of Independent Disks (RAID) configuration, according to an embodiment of the inventive concept.

FIG. 1 shows a server including various Solid State Drives (SSDs) in a Redundant Array of Independent Disks (RAID) configuration, according to an embodiment of the inventive concept. In FIG. 1, server 105 is shown. Server 105 is shown as including conventional internal components, such as central processing unit 105, and memory 110. Although not shown in FIG. 1, a person skilled in the art will recognize that server 105 can include other internal components, such as other graphics cards, modems, etc., as well as other components, such as other input/output devices like a printer. In addition, a person skilled in the art will recognize that server 105 can interact with other computer systems, either directly or over a network (not shown) of any type. Finally, server 105 can be replaced with any type of machine or computing device, including, for example, a laptop computer, a tablet computer, a personal digital assistant (PDA), or a smart phone, among other possibilities.

Server 105 can also include RAID controller 115, which can control various disks, such as SSDs 120-1, 120-2, 120-3, 120-3, and 120-5. Embodiments of the inventive concept are applicable to any RAID configuration that provides some level of redundancy for the data (in other words, any RAID level other than RAID 0, which provides no data redundancy). Specific examples of RAID levels to which embodiments of the inventive concept are applicable, without limitation, include RAID levels 5 and 6, discussed further with reference to FIGS. 3-4 below.

Figure 2:
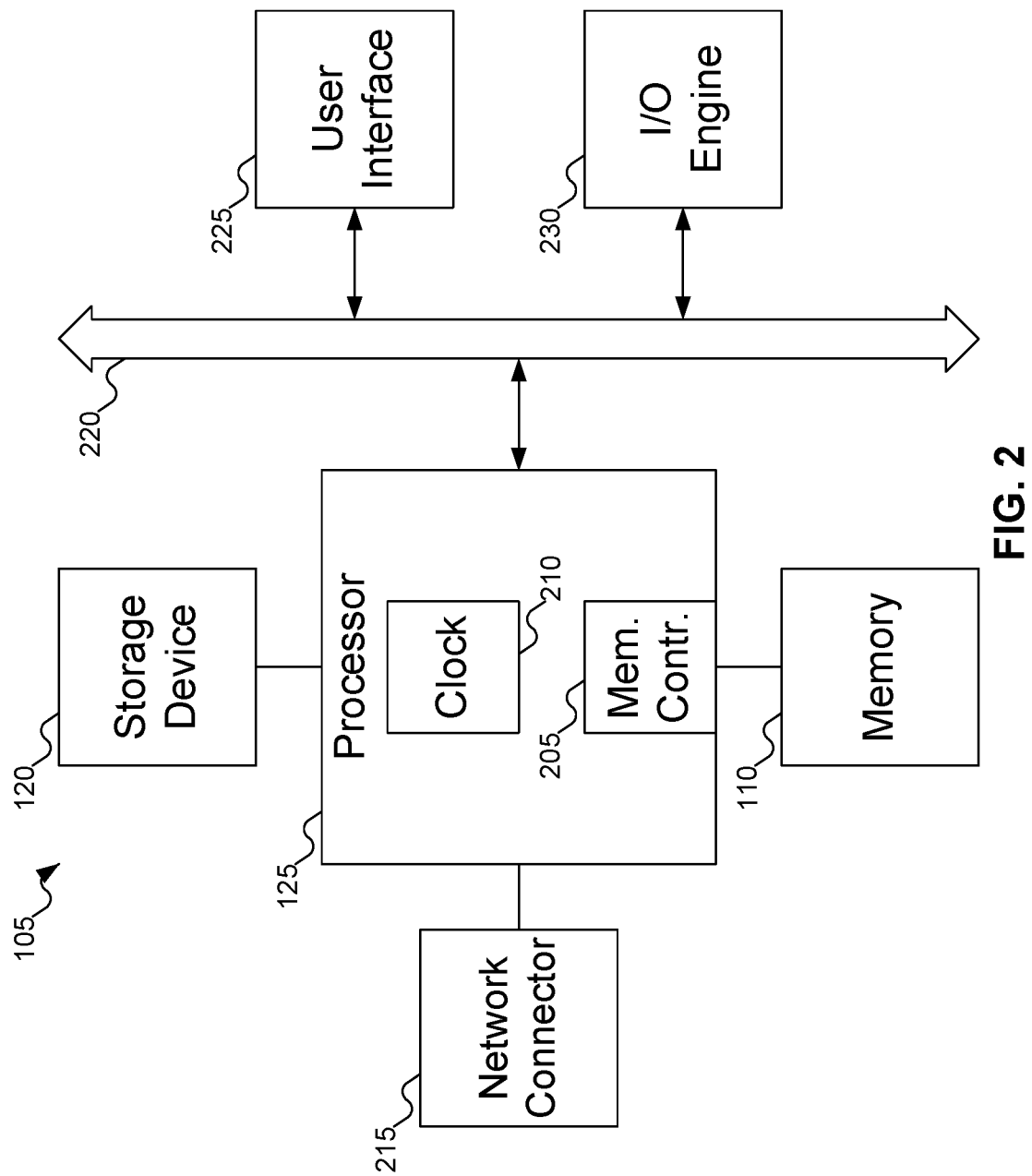
FIG. 2 shows a device that can use the RAID controller of FIG. 1 to manage garbage collection within the SSDs of FIG. 1.
Figure 3:
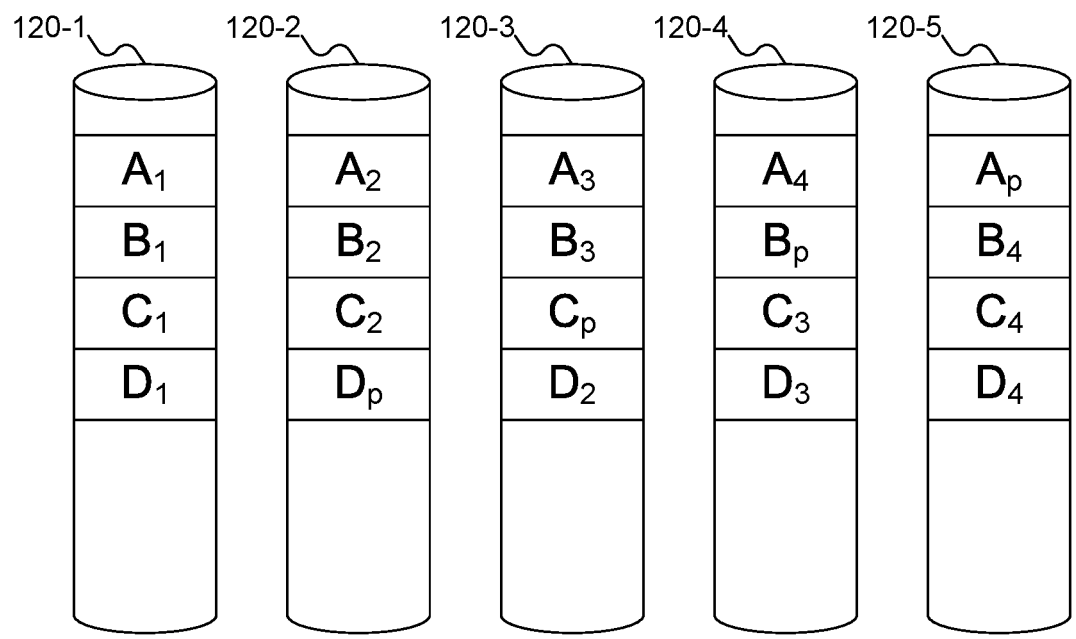
FIGS. 3-4 show the SSDs of FIG. 1 in various RAID configurations.
Figure 4:
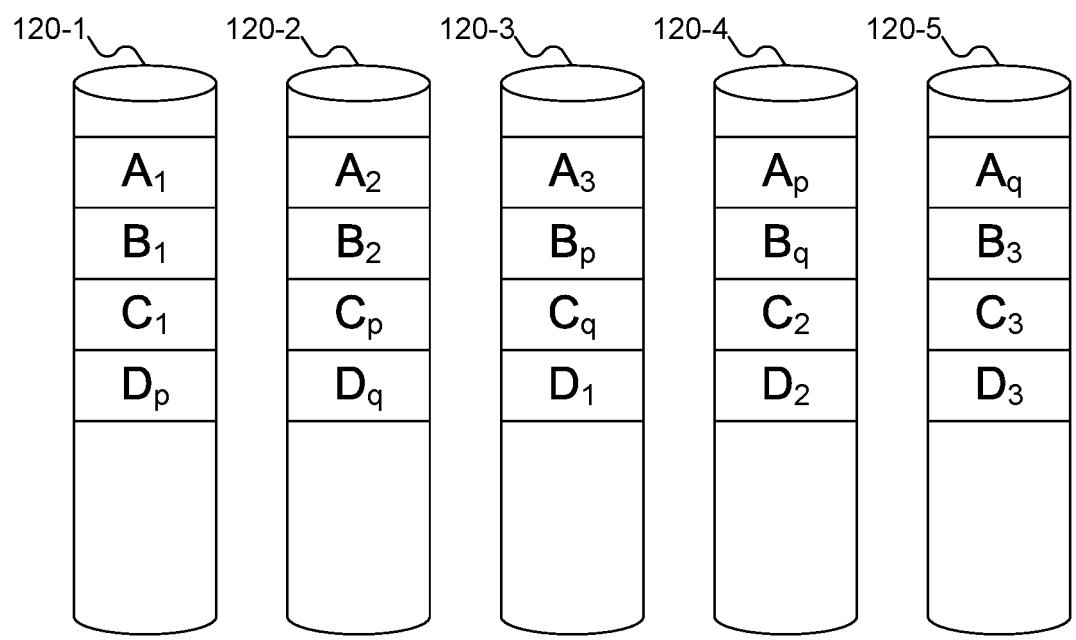

FIG. 2 shows an alternative view of server 105 of FIG. 1. In FIG. 2, typically, server 105 include one or more processors 125, which can include memory controller 205 and clock 210, which can be used to coordinate the operations of the components of server 105. Processors 125 can also be coupled to memory 110, which can include random access memory (RAM), read-only memory (ROM), or other state preserving media, as examples. Processors 125 can also be coupled to storage devices 120, and to network connector 215, which can be, for example, an Ethernet connector. Processors 125 can also be connected to a bus 220, to which can be attached user interface 225 and input/output interface ports that can be managed using input/output engine 230, among other components. FIGS. 3-4 show the SSDs of FIG. 1 in various RAID configurations. FIG. 3 shows RAID level 5. RAID level 5 can be described as block-level striping with distributed parity. In FIG. 3, four sets of blocks A, B, C, and D are shown. Four of the SSDs store one of these blocks, and one of the SSDs stores a parity block. So, for example, blocks $A_1$, $A_2$, $A_3$, and $A_4$ are distributed across the disks in the RAID configuration, along with parity block $A_p$. Note that the various parity blocks $A_p$, $B_p$, $C_p$, and $D_p$ are distributed across the disks in the RAID configuration: they are not all stored on a single disk (hence "distributed parity").

RAID level 5 requires a minimum of 3 disks: two for data and one for parity. However, as shown in FIG. 3, additional disks can be included. Since one disk is used for parity, if a RAID level 5 configuration includes n disks, then the efficiency of the RAID configuration is $1-1/n$. RAID level 5 can support the loss of a single disk.

In contrast, FIG. 4 shows RAID level 6. RAID level 6 is similar to RAID level 5, except that RAID level 6 includes double distributed parity. RAID level 6 requires a minimum of 4 disks: two for data and two for parity. However, as shown in FIG. 4, additional disks can be included. Since two disks are used for parity, if a RAID level 6 configuration includes n disks, then the efficiency of the RAID configuration is $1-2/n$. RAID level 6 can support the loss of two disks.

Figure 5:
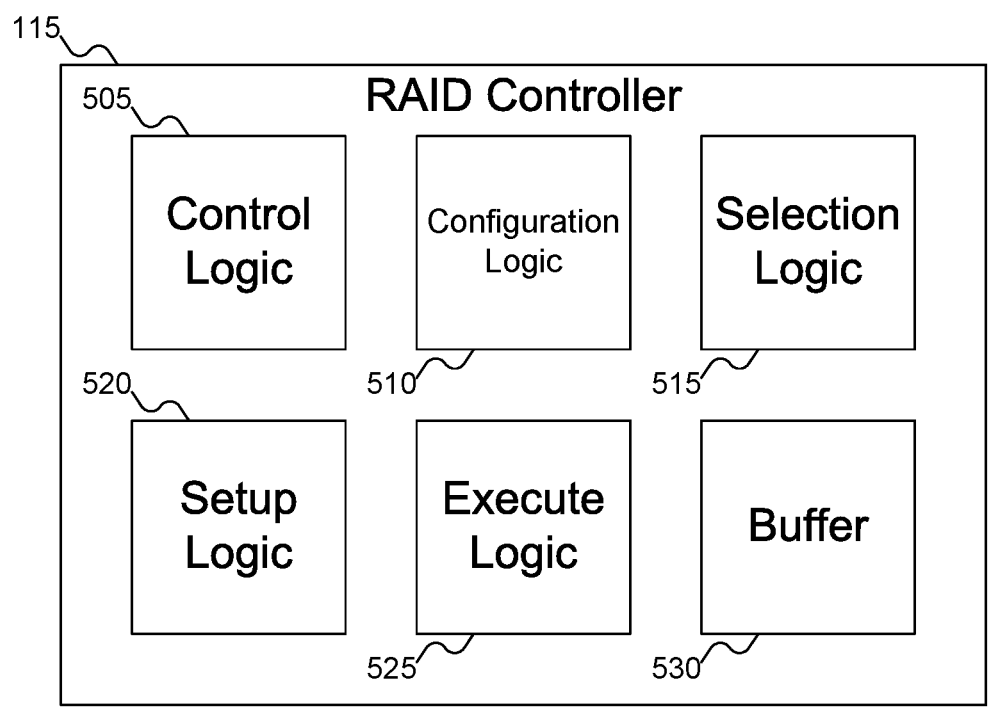
FIG. 5 shows details of the RAID controller of FIG. 1.

FIG. 5 shows details of RAID controller 115 of FIG. 1. In FIG. 5, RAID controller 115 can include control logic 505, configuration logic 510, selection logic 515, setup logic 520, execute logic 525, and buffer 530. Control logic 505 can control how read and write requests are handled by RAID controller 115. Configuration logic 510 can be used to configure SSDs 120-1, 120-2, 120-3, 120-4, and 120-5 of FIG. 1 so that they do not perform garbage collection except when instructed to do so by RAID controller 115. Selection logic 515 can select which SSDs 120-1, 120-2, 120-3, 120-4, and 120-5 of FIG. 1 enter the garbage collection setup phase and which enter the garbage collection execute phase. Setup logic 520 can instruct SSDs 120-1, 120-2, 120-3, 120-4, and 120-5 of FIG. 1 to enter the garbage collection setup phase. Execute logic 525 can instruct SSDs 120-1, 120-2, 120-3, 120-4, and 120-5 of FIG. 1 to enter the garbage collection execute phase. And buffer 530 can be used to store information from write requests that are directed toward an SSD in the garbage collection execute phase. When the SSD completes its garbage collection, write data in buffer 530 can be delivered to the SSD to complete the write requests.

RAID controller 115 can be implemented as hardware, software, or a combination thereof, as desired. For example, the various logic elements can be circuitry specially designed to perform various tasks. Alternatively, the various logic elements can be software. Embodiments of the inventive concept are intended to cover both hardware and software logic elements.

Figure 6:
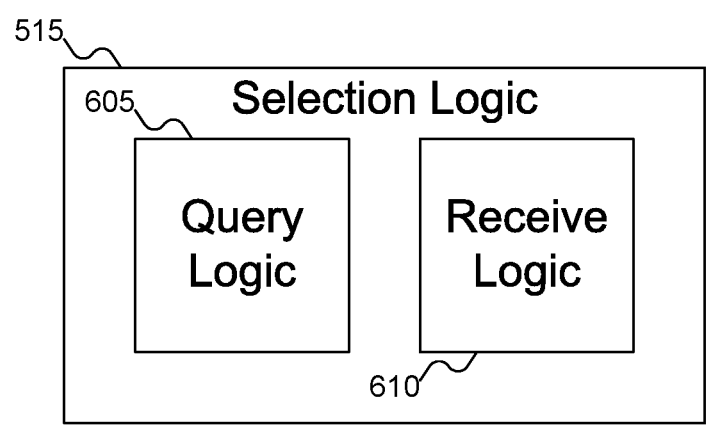
FIG. 6 shows details of the selection logic of FIG. 5.

FIG. 6 shows details of selection logic 515 of FIG. 5. In FIG. 6, selection logic 515 is shown as including query logic 605 and receive logic 610. Query logic 605 can query SSDs 120-1, 120-2, 120-3, 120-4, and 120-5 of FIG. 1 for their free sector size. Query logic 605 can also query SSDs 120-1, 120-2, 120-3, 120-4, and 120-5 of FIG. 1 for whether SSDs 120-1, 120-2, 120-3, 120-4, and 120-5 of FIG. 1 are in need of static wear leveling. Static wear leveling permits an SSD to move data around, so that the number of writes to data elements across the SSD are relatively uniform (since data elements can only support a known number of writes before they become unreliable). Receive logic 610 can receive from SSDs 120-1, 120-2, 120-3, 120-4, and 120-5 of FIG. 1 their free sector sizes and whether they need to perform static wear leveling. Selection logic 515 can then use the free sector sizes of SSDs 120-1, 120-2, 120-3, 120-4, and 120-5 of FIG. 1 to decide which SSD (if any) should enter garbage collection. Selection logic 515 can select which SSD should enter garbage collection using any desired algorithm. For example, selection logic 515 can select an SSD that has the lowest ratio of free sector sizes to total space of the SSD, or an SSD that has indicated a need to perform static wear leveling for some threshold amount of time.

Note that while FIG. 6 shows selection logic 515 as including both query logic 605 and receive logic 610, selection logic 515 can omit query logic 605. For example, SSDs 120-1, 120-2, 120-3, 120-4, and 120-5 of FIG. 1 might periodically transmit their free sector sizes and their need to perform static wear leveling to selection logic 515, enabling selection logic 515 to select an SSD to perform garbage collection.

Figure 7:
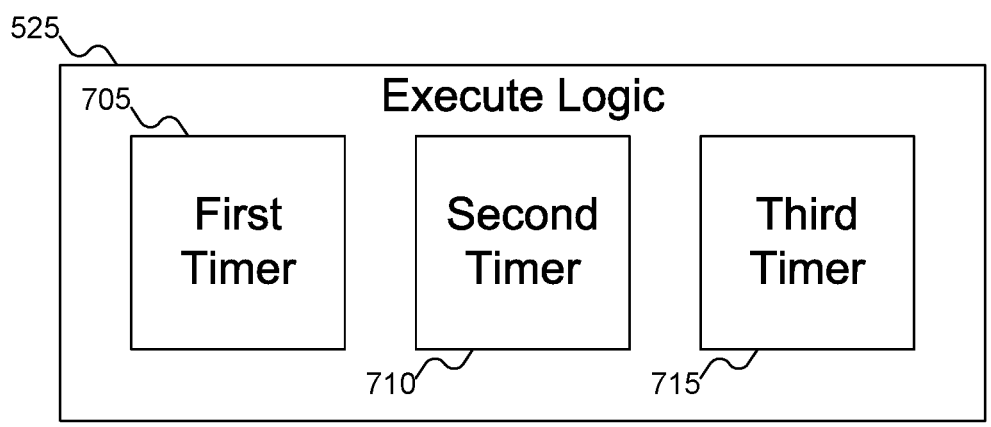
FIG. 7 shows details of the execute logic of FIG. 5.

FIG. 7 shows details of execute logic 525 of FIG. 5. In FIG. 7, execute logic 525 is shown as including three timers 705, 710, and 715. Timer 705 can determine when the selected SSD can enter the garbage collection execute phase. Put another way, timer 705 can specify how long the selected SSD can be in the garbage collection setup phase before entering the garbage collection execute phase. After timer 705 indicates that the selected SSD can enter the garbage collection execute phase, execute logic 525 can send a signal to the selected SSD to begin the garbage collection execute phase.

Note that timer 705 can measure an amount of time that might be less than the selected SSD would need to completely perform garbage collection setup. This condition is considered acceptable, since giving each selected SSD sufficient time to completely perform garbage collection might take too long, leaving other SSDs with insufficient free blocks. Thus, timer 705 can give the selected SSD time to perform some garbage collection setup, but not necessarily all garbage collection setup.

Timer 710 can determine how long the selected SSD remains in the garbage collection execute phase, after which execute logic 525 can instruct the selected SSD to stop erasing blocks. Note that timer 710 can measure an amount of time that might be less than the selected SSD would need to completely perform garbage collection. This condition is considered acceptable, since giving each selected SSD sufficient time to completely perform garbage collection might take too long, leaving other SSDs with insufficient free blocks. Thus, timer 710 can give the selected SSD time to perform some garbage collection, but not necessarily all garbage collection.

Timer 715 can measure how long it takes the selected SSD to perform an erase operation. As noted above, timer 710 can result in the selected SSD being asked to stop garbage collection before garbage collection is complete. In the worst case, the selected SSD will have just begun an erase operation. While this erase operation is being processed, the block in question (and possibly other blocks) cannot process read or write requests. Thus, the selected SSD needs to be given enough time for an erase operation to complete before read and write requests are scheduled for the selected SSD. Timer 715 measures this amount of time needed for an erase operation to complete on the selected SSD, after which RAID controller 115 of FIG. 1 can again schedule read and write requests for the selected SSD. Note that while it is desirable for the same model drives to be used for all drives in the RAID configuration, the RAID configuration can be assembled from different models of SSDs. Therefore, timer 715 might need to measure different amounts of time, depending on how long it takes different SSDs to perform erase operations.

Figure 8:
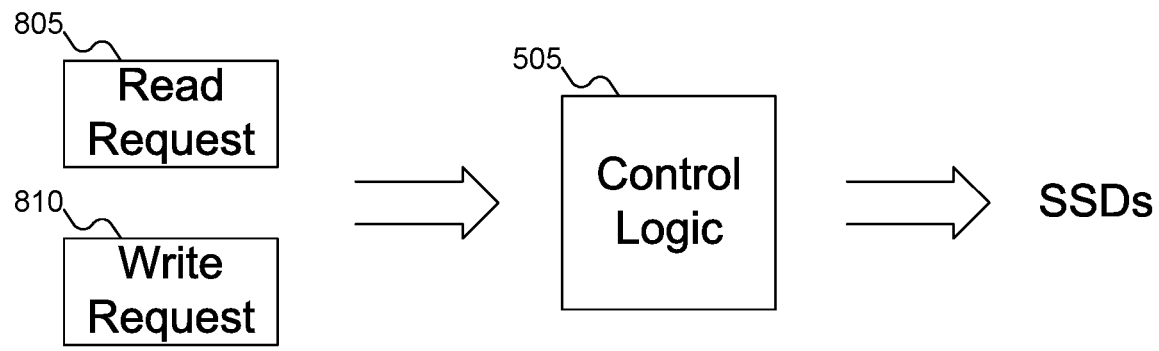
FIG. 8 shows the control logic of FIG. 5 controlling the delivery of read and write requests to the SSDs of FIG. 1.

FIG. 8 shows the control logic of FIG. 5 controlling the delivery of read and write requests to the SSDs of FIG. 1. In FIG. 8, control logic 505 is shown receiving read request 805 and write request 810. Control logic 505 can control to which SSD these requests are sent.

Normally, control logic 505 will direct read request 805 and write request 810 to the SSD that contains the data being accessed. But if the target SSD is currently undergoing garbage collection, directing either request to the target SSD might cause unnecessary delay. More specifically, if the desired data is on an SSD undergoing garbage collection, the SSD might need to complete an erase operation before it can process the request. Since erase operations are slow compared to read and write requests, waiting for the target SSD to process the request can cause excessive delay, relative to what the request would normally require.

A faster way to process the request than to wait for the target SSD to complete garbage collection would be to use the other SSDs not currently undergoing garbage collection. For example, to read data, each of the other SSDs in the RAID configuration can be accessed, and the requested data can be reconstructed from the other SSDs.

To provide a more concrete example, refer back to FIG. 3, and assume that SSD 120-1 was in garbage collection execute phase. Instead of waiting for SSD 120-1 to finish its garbage collection, blocks $A_2$, $A_3$, $A_4$, and $A_p$ can be read. From these blocks, block $A_1$ can be reconstructed and the requested data delivered, without having to wait for SSD 120-1 to complete garbage collection.

Returning to FIG. 8, if write request 810 is destined for an SSD performing garbage collection, then control logic 505 can direct write request 810 to buffer 530 of FIG. 5. Alternatively, if the selected SSD includes its own buffer, then control logic 505 can direct write request 810 to the selected SSD, anyway, letting the SSD buffer write request 810.

Figure 9:
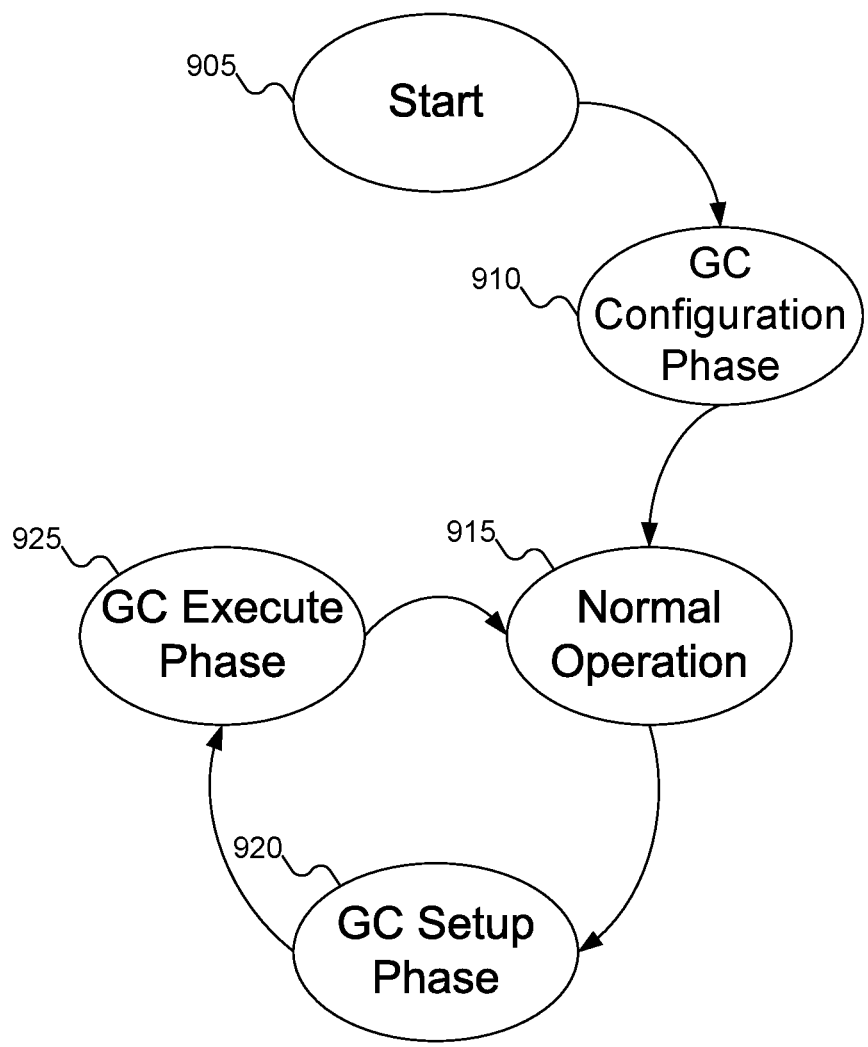
FIG. 9 shows a state diagram of the operation of the SSDs of FIG. 1.

FIG. 9 shows a state diagram of the operation of the SSDs of FIG. 1. In FIG. 9, SSDs 120-1, 120-2, 120-3, 120-4, and 120-5 of FIG. 1 start in start phase 905. From there, SSDs 120-1, 120-2, 120-3, 120-4, and 120-5 of FIG. 1 transition to configuration phase 910. In configuration phase 910, configuration logic 510 of FIG. 5 can configure SSDs 120-1, 120-2, 120-3, 120-4, and 120-5 of FIG. 1 to only perform garbage collection when explicitly instructed to do so by RAID controller 115 of FIG. 1. After SSDs 120-1, 120-2, 120-3, 120-4, and 120-5 of FIG. 1 have been configured, SSDs 120-1, 120-2, 120-3, 120-4, and 120-5 of FIG. 1 enter normal operation phase 915. During normal operation phase 915, SSDs 120-1, 120-2, 120-3, 120-4, and 120-5 of FIG. 1 can process read requests 805 of FIG. 8 and write requests 810 of FIG. 8 normally.

Eventually, SSDs 120-1, 120-2, 120-3, 120-4, and 120-5 of FIG. 1 will likely transition to garbage collection setup phase 920 (although not necessarily at the same time). In garbage collection setup phase 920, SSDs 120-1, 120-2, 120-3, 120-4, and 120-5 of FIG. 1 can set up for garbage collection. Garbage collection setup phase 920 can involve copying valid data from blocks scheduled for erase operations to other blocks. Note that during garbage collection setup phase 920, an SSD can still receive and process read requests 805 of FIG. 8 and write requests 810 of FIG. 8: such requests can be given priority over garbage collection setup. Therefore, more than one SSD can be in garbage collection setup phase 920 at the same time.

Finally, when RAID controller 115 of FIG. 1 selects an SSD for garbage collection, the selected SSD can enter garbage collection execute phase 925. In garbage collection execute phase 925, the selected SSD can perform erase operations. As described above with reference to FIG. 7, the selected SSD can enter and exit garbage collection execute phase 925 upon instruction from execute logic 525 of FIG. 5. After exiting garbage collection execute phase 925, the SSD returns to normal operation phase 915.

The above discussion focuses on only one SSD entering garbage collection execute phase 925 at any time. In RAID configurations that can tolerate the loss of a single drive, such as RAID 5 (described above with reference to FIG. 3), this makes sense. When an SSD performs garbage collection, the SSD is taken out of the RAID (if only temporarily). Since the RAID needs to be able to satisfy read and write requests from clients, in RAID 5 (and other RAID configurations that only support the loss of a single drive) at most one SSD can perform garbage collection at a time.

But other RAID configurations can support the loss of more than one drive. For example, RAID 6 (described above with reference to FIG. 4) can support the loss of two drives from the RAID. Thus, in a RAID 6 configuration, up to two SSDs can perform garbage collection at the same time, without impacting the RAID's ability to service requests from clients. More generally, if a RAID configuration can lose up to k (which can be called the "RAID failure number") drives and still satisfy client requests, then up to k SSDs can execute garbage collection at the same time in that RAID configuration. In the rest of the description below and in embodiments of the inventive concept, any reference to SSDs executing garbage collection is intended to encompass up to the RAID failure number of SSDs executing garbage collection.

Figure 10:
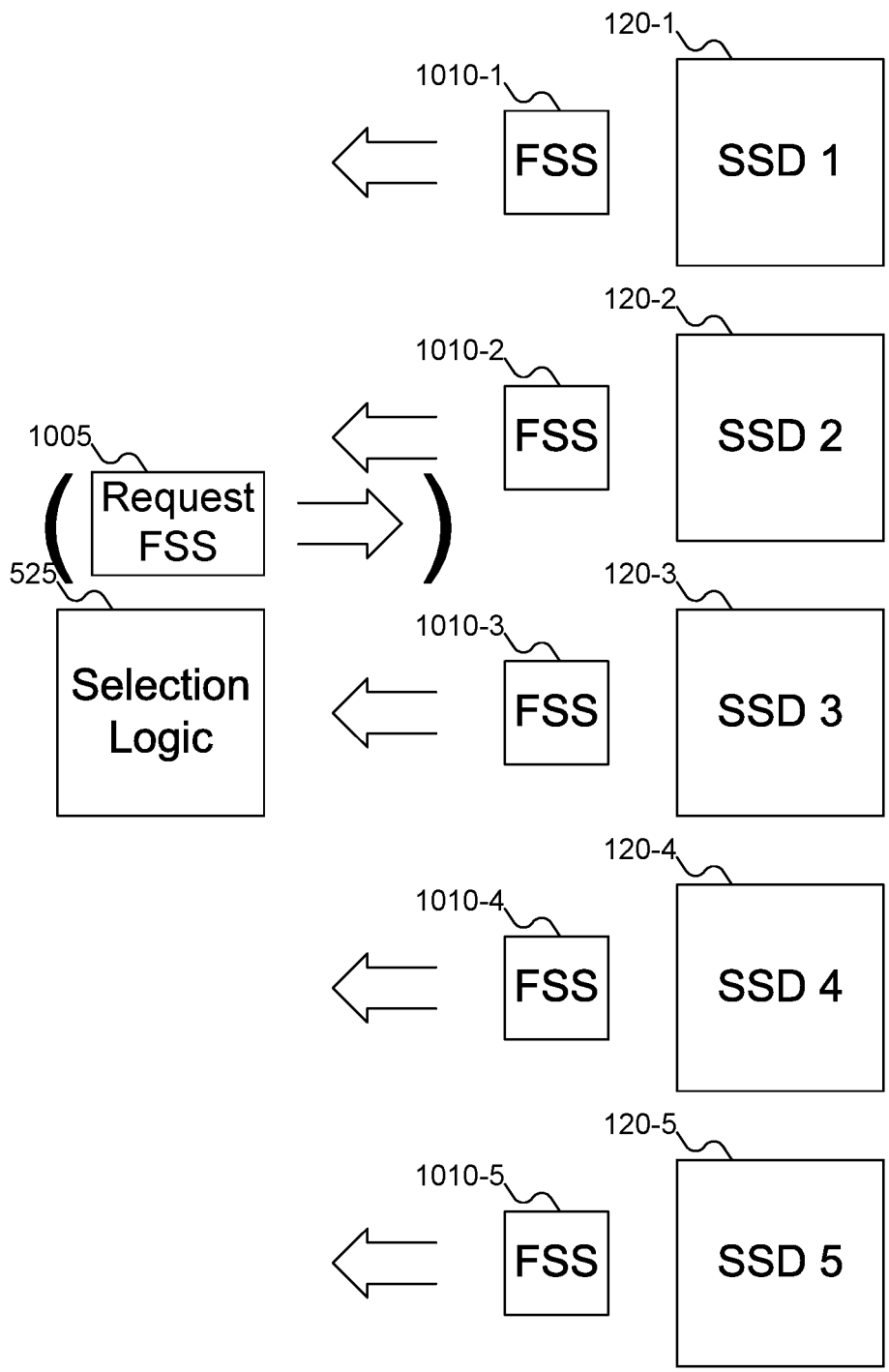
FIG. 10 shows the selection logic of FIG. 5 processing free sector size information from the SSDs of FIG. 1.

FIG. 10 shows selection logic 525 of FIG. 5 processing free sector size information from the SSDs of FIG. 1. In FIG. 10, selection logic 525 is shown as sending request 1005 to SSDs 120-1, 120-2, 120-3, 120-4, and 120-5, requesting their free sector sizes. SSDs 120-1, 120-2, 120-3, 120-4, and 120-5 can respond with free sector sizes 1010-1, 1010-2, 1010-3, 1010-4, and 1010-5. SSDs 120-1, 120-2, 120-3, 120-4, and 120-5 can also provide information about whether they need to perform static wear leveling. Selection logic 525 can then use this information to select which SSD should perform garbage collection. Note, as discussed above, that selection logic 525 can select multiple SSDs to enter garbage collection setup phase 920 of FIG. 9; but the number of SSDs in garbage collection execute phase 925 at any one time should be no greater than the RAID failure number.

Note that request 1005 is shown in parenthesis. As discussed above with reference to FIG. 6, in some embodiments of the inventive concept, selection logic 525 can actively query SSDs 120-1, 120-2, 120-3, 120-4, and 120-5 about their free sector sizes. But in other embodiments of the inventive concept, SSDs 120-1, 120-2, 120-3, 120-4, and 120-5 can send free sector sizes 1010-1, 1010-2, 1010-3, 1010-4, and 1010-5 without being queried. In such embodiments of the inventive concept, SSDs 120-1, 120-2, 120-3, 120-4, and 120-5 can send free sector sizes 1010-1, 1010-2, 1010-3, 1010-4, and 1010-5 on any desired schedule: for example, at regular intervals (e.g., every 5 milliseconds (ms)), or when free sector sizes 1010-1, 1010-2, 1010-3, 1010-4, and 1010-5 begin to approach levels indicating a need for garbage collection.

Figure 11:
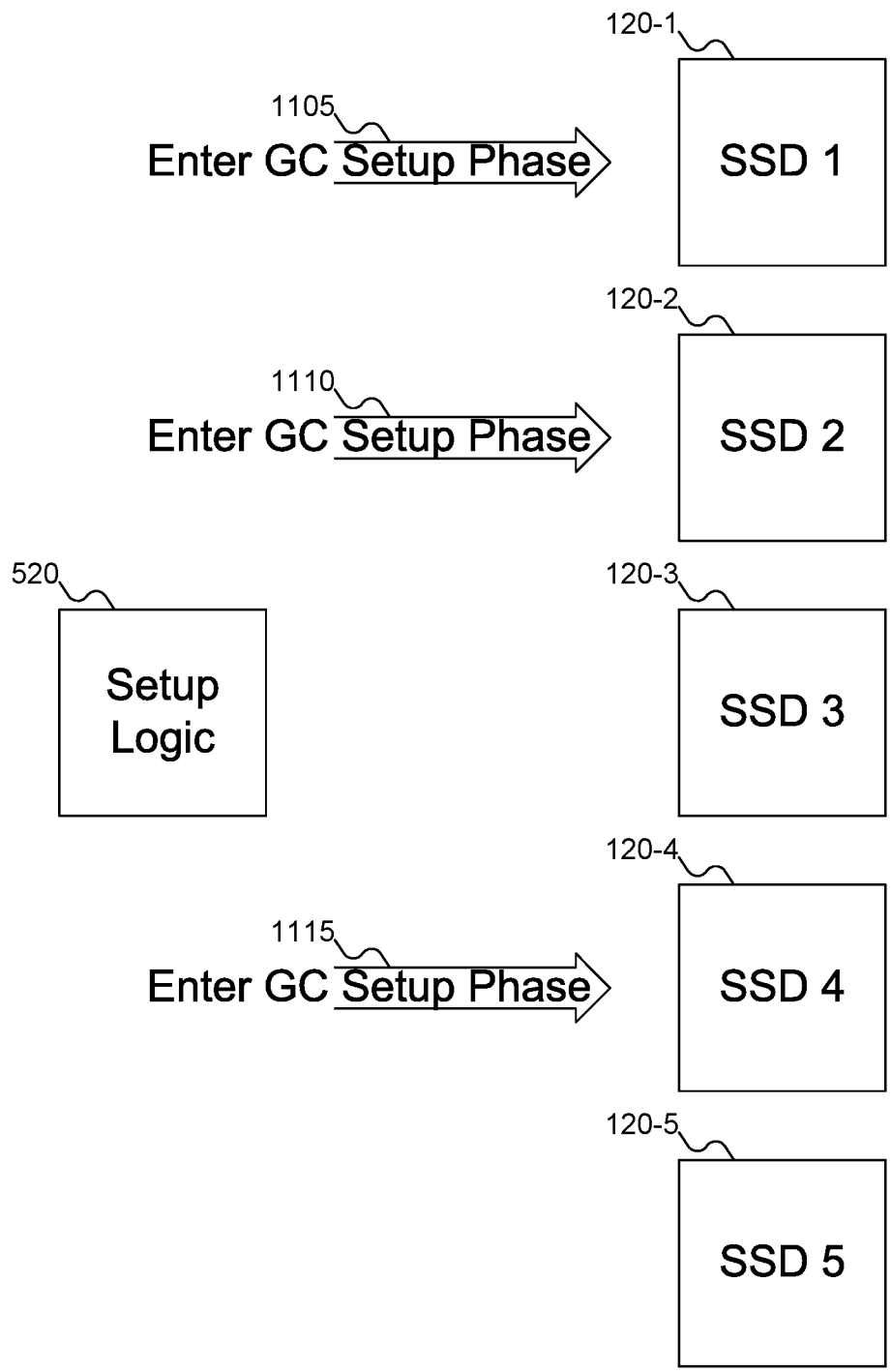
FIG. 11 shows the selection logic of FIG. 5 instructing some of the SSDs of FIG. 1 to enter the garbage collection setup phase.

As described above, selection logic 525 of FIG. 5 can select more than one SSD to enter garbage collection setup phase 920 of FIG. 9. FIG. 11 illustrates this scenario. In FIG. 11, selection logic 525 has selected SSDs 120-1, 120-2, and 120-4 to enter garbage collection setup phase 920 of FIG. 9. Selection logic 525 can send instructions 1105, 1110, and 1115 to SSDs 120-1, 120-2, and 120-4, respectively, instructing those SSDs to enter garbage collection setup phase 920 of FIG. 9. SSDs 120-3 and 120-5 therefore remain in normal operation phase 915 of FIG. 9.

Figure 12:
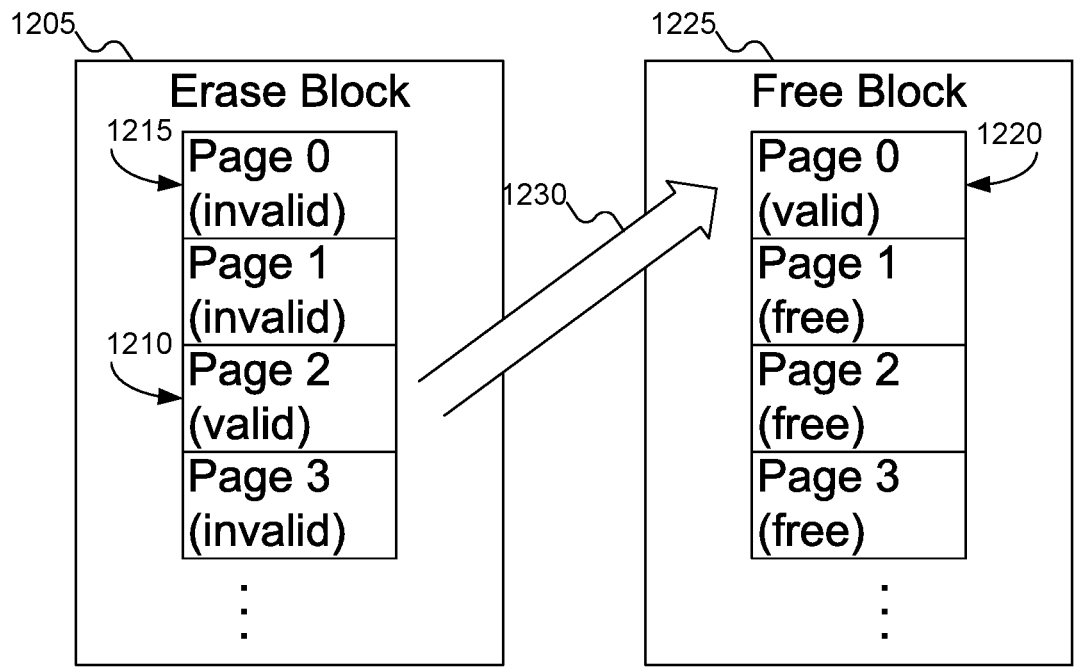
FIG. 12 shows a block being prepared for erasure in one of the SSDs of FIG. 1.

FIG. 12 shows a block being prepared for erasure in one of the SSDs of FIG. 1. This preparation can be part of garbage collection setup phase 920 of FIG. 9. In FIG. 12, erase block 1205 is shown. Erase block 1205 represents a block that is scheduled for erasure during garbage collection. One feature of SSDs is that data is read and written at the page level, but erasure is performed at the block level. Thus, for example, block 1205 is shown as including a number of pages. Some of these pages, such as page 1210, contain valid data: that is, data that is current. Other pages, such as page 1215 contain invalid data: that is, data that was once valid but is no longer current, perhaps because it was "overwritten" with new data (in an SSD, newly written data is written to a free page, rather than over the existing data in a valid page). While FIG. 12 shows only four pages in block 1205, block 1205 can contain any number of pages: for example, 1024. The number of pages in a block of an SSD is typically a design choice of the manufacturer.

Before block 1205 can be erased, any valid data in block 1205 must be copied out of the block. That is, any valid pages in block 1205 must be copied to other free pages, or else the data they contain will be lost. Thus, page 1210 is shown being copied to page 1220 in free block 1225 (this copy is shown as operation 1230). Once page 1210 has been copied to page 1220 in free block 1225, page 1210 can be marked as invalid, which frees block 1205 for erasure. (Of course, if there are additional valid pages in block 1205, they also need to be copied before block 1205 can be erased). Once all the pages in block 1205 are marked as invalid, block 1205 is ready for erasure, which can be performed during garbage collection execute phase 925 of FIG. 9.

While FIG. 12 shows page 1210 being copied to page 1220 in free block 1225, page 1220 does not need to be a free page. That is, block 1225 can store some valid data and some free pages. The destination block for a copy of valid data from a block targeted for erasure can depend on how much data needs to be copied. For example, if the SSD contains several blocks each partially filled with valid data, it might make sense to copy all of those pages into a single free block. On the other hand, if the amount of data needing to be copied from a block targeted for erasure is low, the SSD can copy the valid data to a free page in a block currently in use.

Figure 13:
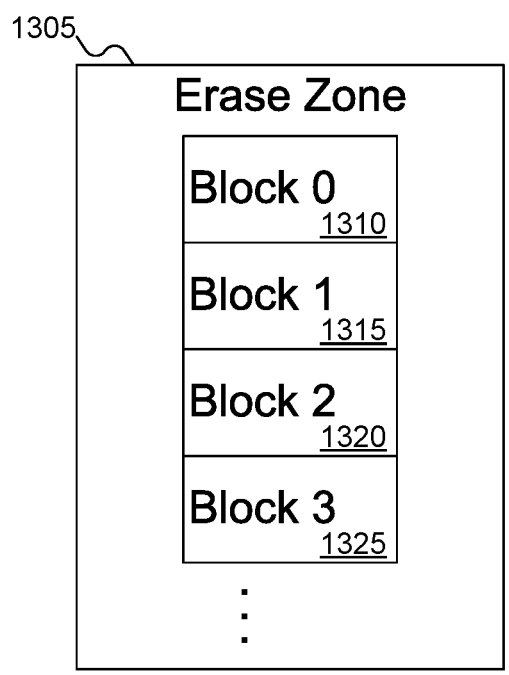
FIG. 13 shows an erase zone operating in one of the SSDs of FIG. 1.

In FIG. 12, the target for an erase operation is a single block. But erase operations can operate at levels higher than a block. FIG. 13 shows an erase zone operating in one of the SSDs of FIG. 1. In FIG. 13, erase zone 1305 is shown, including various blocks 1310, 1315, 1320, and 1325. If an SSD performs erase operations on erase zone 1305, then any valid data in any pages within blocks 1310, 1315, 1320, and 1325 need to be copied out of erase zone 1305 before the erase operation is performed. The procedure is the same as that described above with reference to FIG. 12; the procedure is simply performed on multiple blocks within erase zone 1305.

Figure 14A:
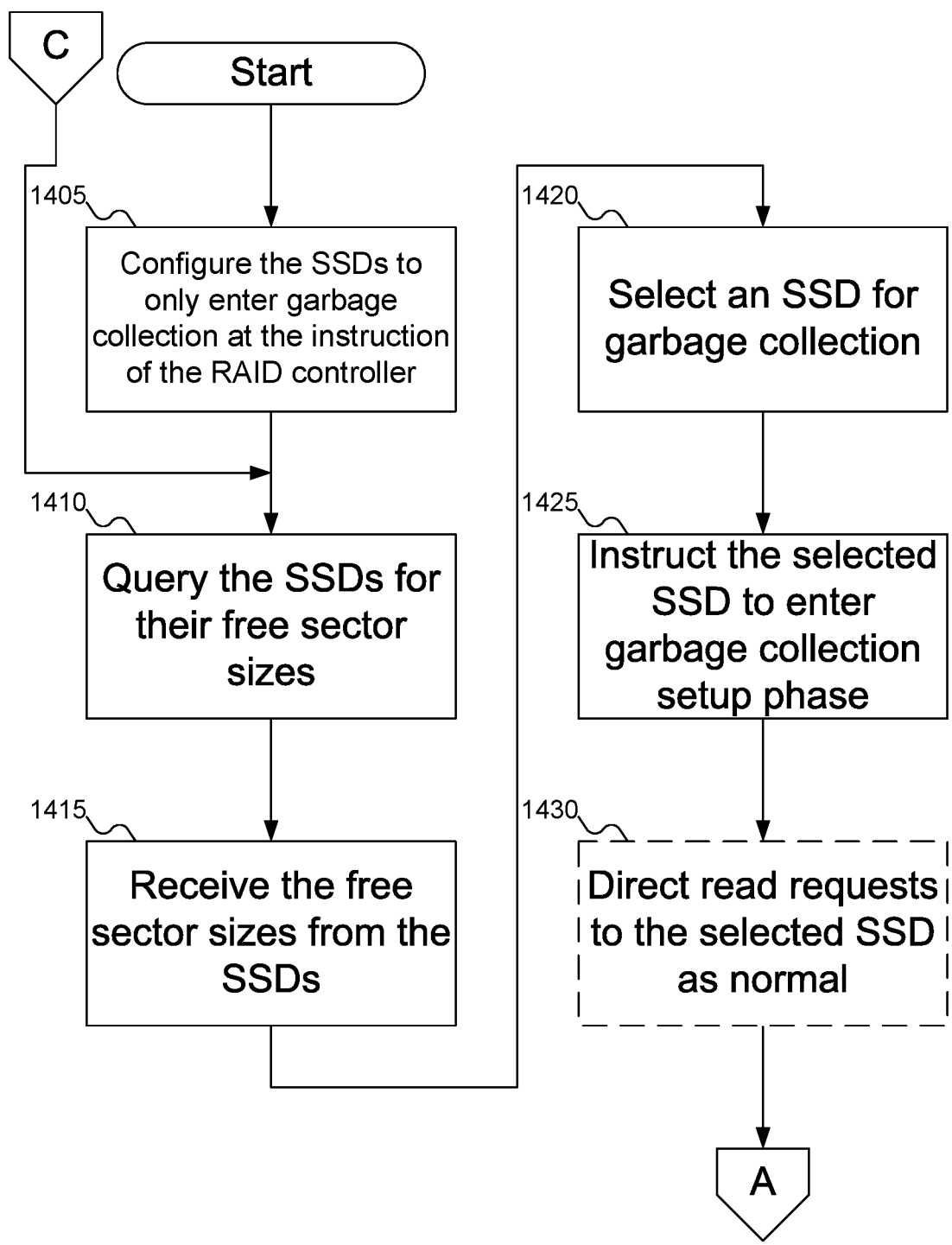
FIGS. 14A-14C show a flowchart of a procedure for the RAID controller of FIG. 1 to control garbage collection within the SSDs of FIG. 1, according to an embodiment of the inventive concept.
Figure 14B:
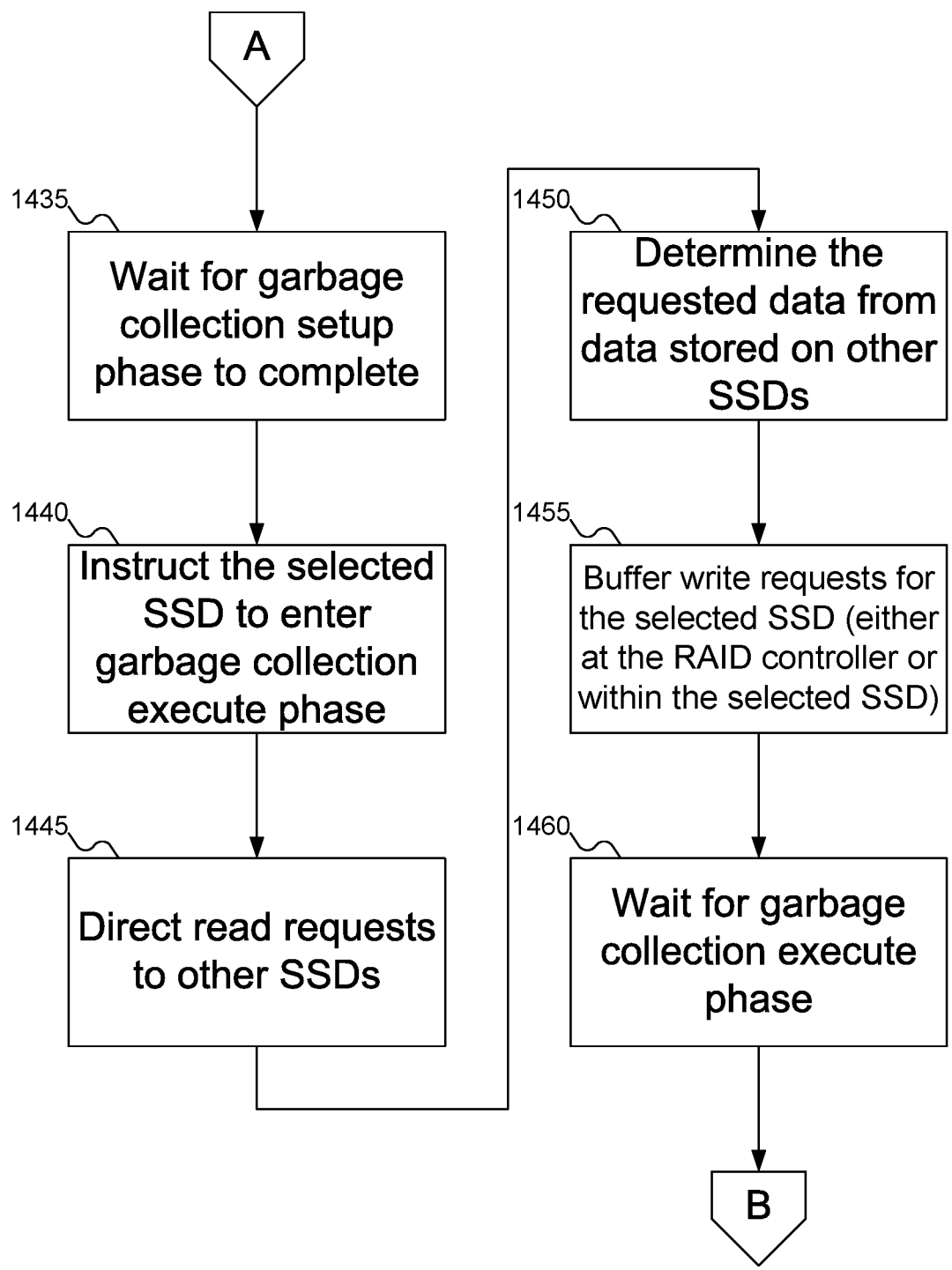
Figure 14C:
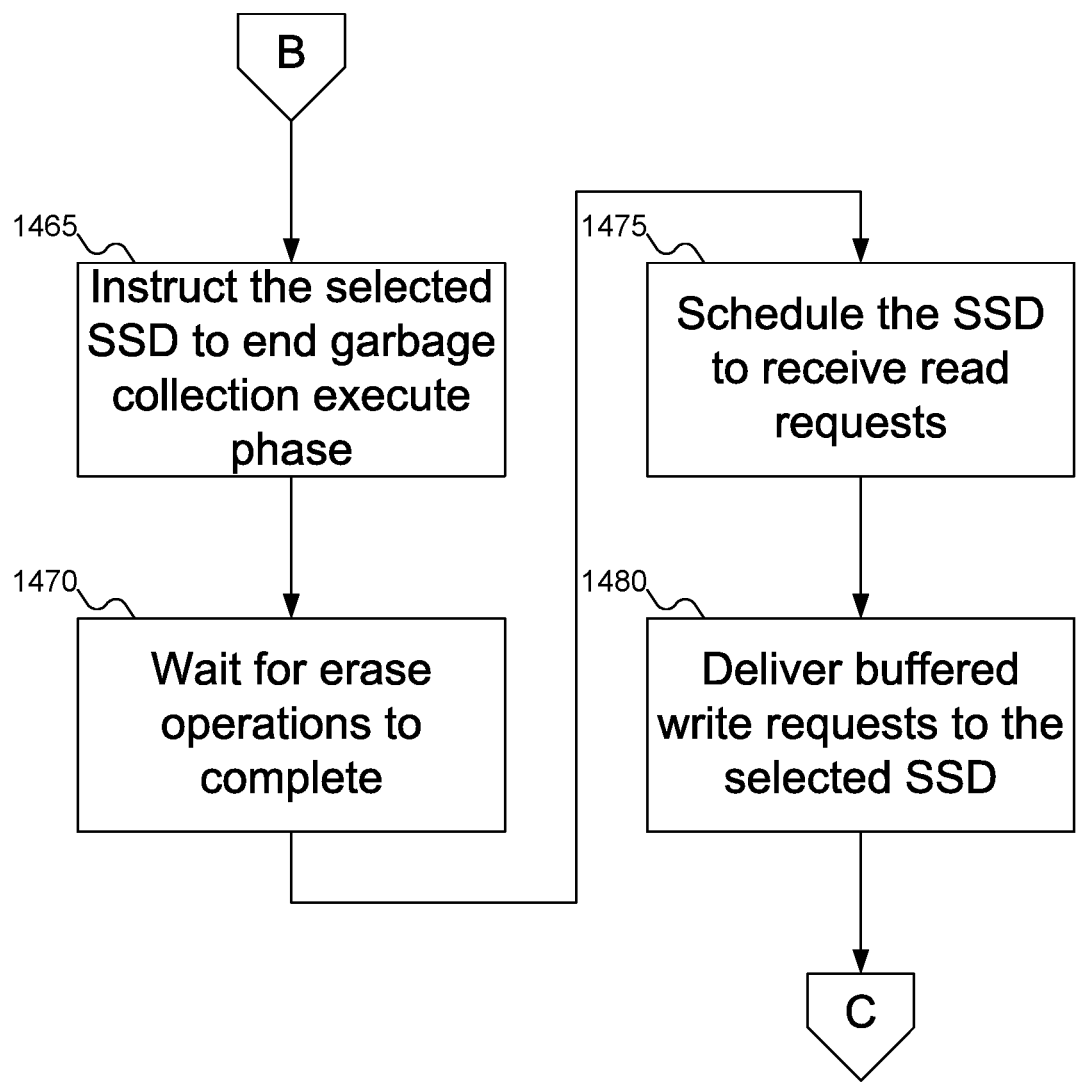

FIGS. 14A-14C show a flowchart of a procedure for the RAID controller of FIG. 1 to control garbage collection within the SSDs of FIG. 1, according to an embodiment of the inventive concept. In FIG. 14A, at block 1405, configuration logic 510 of FIG. 5 can configure SSDs 120-1, 120-2, 120-3, 120-4, and 120-5 of FIG. 1 to not perform garbage collection except when instructed to do so by RAID controller 115 of FIG. 1. At block 1410, selection logic 515 of FIG. 5 can query SSDs 120-1, 120-2, 120-3, 120-4, and 120-5 of FIG. 1 for their free sector sizes 1010-1, 1010-2, 1010-3, 1010-4, and 1010-5 of FIG. 10. At block 1415, selection logic 515 of FIG. 5 can receive free sector sizes 1010-1, 1010-2, 1010-3, 1010-4, and 1010-5 of FIG. 10 from SSDs 120-1, 120-2, 120-3, 120-4, and 120-5 of FIG. 1. As described above with reference to FIG. 10, in some embodiments of the inventive concept SSDs 120-1, 120-2, 120-3, 120-4, and 120-5 of FIG. 1 can provide free sector sizes 1010-1, 1010-2, 1010-3, 1010-4, and 1010-5 of FIG. 10 without selection logic 515 of FIG. 5 querying for this information.

At block 1420, selection logic 515 of FIG. 5 can select an SSD to perform garbage collection. As described above with reference to FIG. 9, selection logic 515 of FIG. 5 can select more than one SSD for garbage collection setup phase 920 of FIG. 9. At block 1425, setup logic 520 of FIG. 5 can instruct the selected SSD(s) to enter garbage collection setup phase 920 of FIG. 9. At block 1430, control logic 505 of FIG. 5 can continue to send read requests 805 of FIG. 8 to the selected SSD(s) as normal (hence why block 1430 is shown as with dashed lines.

At block 1435 (FIG. 14B), execute logic 525 of FIG. 5 can wait until enough time has passed for garbage collection setup phase 920 of FIG. 9 to complete. In this context, "complete" does not necessarily mean "perform all possible operations", but rather "perform enough operations" or "perform operations until the time for garbage collection has elapsed". If one SSD were given enough time to perform all possible garbage collection operations, it is possible and perhaps likely that the other SSDs in the RAID configuration would require significant garbage collection when it would be their turn. This could easily escalate until all (or most) of the SSDs were continuously in need of garbage collection, resulting in poor performance for all the disks. To avoid this scenario, each SSD can perform some garbage collection without necessarily performing every possible garbage collection step. Thus, in block 1435, the selected SSD can perform some, but not necessarily all, garbage collection setup it actually needs.

In block 1440, execute logic 525 of FIG. 5 can instruct the selected SSD to enter garbage collection execute phase 925 of FIG. 9. Note that in contrast to block 1420 of FIG. 14A, where more than one SSD can be selected for garbage collection setup phase 920 of FIG. 9, in block 1440 of FIG. 14B execute logic 525 of FIG. 5 can select up to the RAID failure number (e.g., one SSD for RAID 5, two SSDs for RAID 6) of SSDs for garbage collection execute phase 925 of FIG. 9. At block 1445, control logic 505 of FIG. 5 can direct read requests 805 of FIG. 8 to other SSDs in the RAID configuration. At block 1450, control logic 505 of FIG. 5 can determine data requested from the selected SSD by using data stored on other SSDs in the RAID configuration. At block 1455, write requests 810 of FIG. 8 can be buffered, either in buffer 530 of FIG. 5 or within the selected SSD, depending on the design of the selected SSD and the RAID configuration. While blocks 1445, 1450, and 1455 are in operation, at block 1460 execute logic 525 of FIG. 5 can wait for garbage collection execute phase 925 of FIG. 9 to complete. As with block 1435, "complete" does not necessarily mean that the selected SSD can perform every garbage collection operation it needs, but rather that the selected SSD can perform enough garbage collection operations to increase the free sector size.

At block 1465 (FIG. 14C), execute logic 525 of FIG. 5 can instruct the selected SSD to end garbage collection execute phase 925 of FIG. 9. As described above with reference to FIG. 7, just because execute logic 525 of FIG. 5 has instructed the selected SSD to end garbage collection does not mean that all garbage collection operations immediately terminate. Therefore, at block 1470, execute logic 525 of FIG. 5 can wait until enough time has elapsed for the selected SSD to complete any pending erase operations. At block 1475, control logic 505 of FIG. 5 can schedule delivery of read requests 805 of FIG. 8 to the selected SSD. Finally, at block 1480, if buffer 530 of FIG. 5 has stored any write requests 810 of FIG. 8 for the selected SSD, RAID controller 115 of FIG. 1 can deliver those buffered write requests 810 of FIG. 8 to the selected SSD. Control can then return to block 1410 of FIG. 14A.

Figure 15:
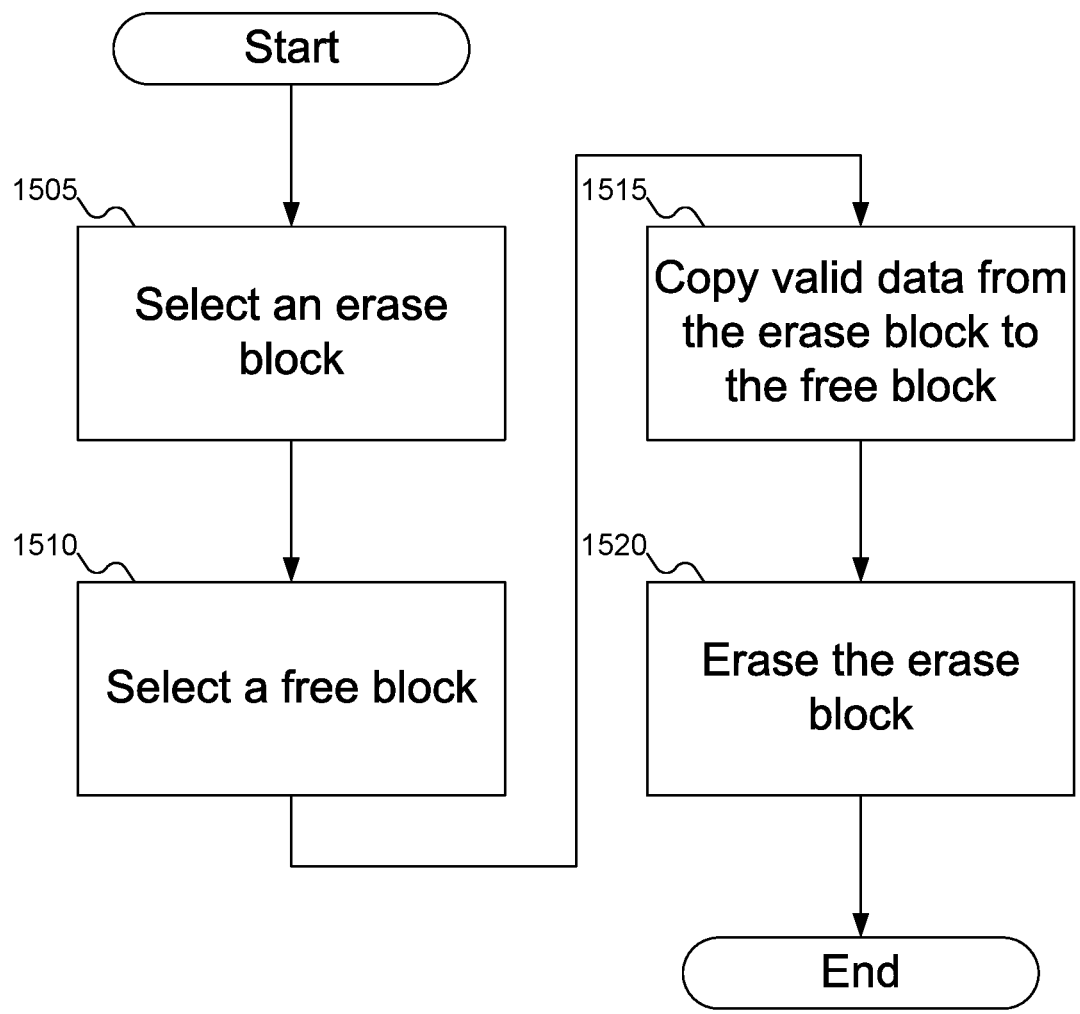
FIG. 15 shows a flowchart of a procedure for the SSDs of FIG. 1 to perform garbage collection on an erase block.

FIG. 15 shows a flowchart of a procedure for the SSDs of FIG. 1 to perform garbage collection on an erase block. In FIG. 15, at block 1505, the selected SSD can select block 1205 of FIG. 12 for erasure. At block 1510, the selected SSD can select free block 1225 of FIG. 12 (or, alternatively, a block with some free pages). At block 1515, the selected SSD can copy valid data 1210 of FIG. 12 from block 1205 of FIG. 12 selected for erasure to free block 1225 of FIG. 12. Finally, at block 1520, the selected SSD can erase block 1205 selected for erasure.

In FIGS. 14A-15, some embodiment of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept can be implemented. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept can extend to the following statements, without limitation:

Statement 1. An embodiment of the inventive concept includes a Redundant Array of Independent Disks (RAID) controller, comprising:

control logic to control read and write requests for a plurality of Solid State Drives (SSDs) in a RAID configuration;

selection logic to select an SSD from the plurality of SSDs for garbage collection based on a plurality of free sector sizes for the plurality of SSDs;

setup logic to instruct the selected SSD to enter a garbage collection setup phase; and execute logic to instruct the selected SSD to enter a garbage collection execute phase.

Statement 2. An embodiment of the inventive concept includes a RAID controller according to statement 1, wherein the RAID controller is implemented in hardware.

Statement 3. An embodiment of the inventive concept includes a RAID controller according to statement 1, wherein the RAID controller is implemented in software.

Statement 4. An embodiment of the inventive concept includes a RAID controller according to statement 1, wherein up to a RAID failure number of SSDs of the plurality of the SSDs in the RAID configuration are in the garbage collection execute phase at any one time.

Statement 5. An embodiment of the inventive concept includes a RAID controller according to statement 1, wherein the setup logic is operative to instruct a subset of the plurality of SSDs to enter the garbage collection setup phase.

Statement 6. An embodiment of the inventive concept includes a RAID controller according to statement 1, further comprising configuration logic to configure each of the SSDs to only perform the garbage collection execute phase upon instruction from the RAID controller.

Statement 7. An embodiment of the inventive concept includes a RAID controller according to statement 1, wherein the execute logic is operative to instruct the selected SSD to end the garbage collection execute phase.

Statement 8. An embodiment of the inventive concept includes a RAID controller according to statement 7, wherein the execute logic includes a first timer to determine when to instruct the selected SSD to start the garbage collection execute phase.

Statement 9. An embodiment of the inventive concept includes a RAID controller according to statement 7, wherein the execute logic includes a second timer to determine when to instruct the selected SSD to end the garbage collection execute phase.

Statement 10. An embodiment of the inventive concept includes a RAID controller according to statement 9, further comprising a third timer to determine when to send read requests to the selected SSD.

Statement 11. An embodiment of the inventive concept includes a RAID controller according to statement 7, wherein the RAID controller includes a buffer to store write requests directed to the selected SSD until after the execute logic has instructed the selected SSD to end the garbage collection execute phase.

Statement 12. An embodiment of the inventive concept includes a RAID controller according to statement 1, wherein:

the selected SSD is operative to copy valid data from an erase block to a free block during the garbage collection setup phase; and the selected SSD is operative to erase the erase block during the garbage collection execute phase.

Statement 13. An embodiment of the inventive concept includes a RAID controller according to statement 1, wherein the RAID controller is operative to send read requests to a subset of all other SSDs in the RAID configuration when the selected SSD is in the garbage collection execute phase.

Statement 14. An embodiment of the inventive concept includes a RAID controller according to statement 1, wherein the selection logic includes receive logic to receive the plurality of free sector sizes from the plurality of SSDs.

Statement 15. An embodiment of the inventive concept includes a RAID controller according to statement 14, wherein the selection logic further includes query logic to query the plurality of SSDs for the plurality of free sector sizes.

Statement 16. An embodiment of the inventive concept includes a RAID controller according to statement 1, wherein the selection logic is operative to select up to a RAID failure number of SSDs from the plurality of SSDs for garbage collection based on a plurality of free sector sizes for the plurality of SSDs.

Statement 17. An embodiment of the inventive concept includes a method, comprising:

selecting a Solid State Drive (SSD) for garbage collection based on a plurality of free sector sizes for a plurality of SSDs in a Redundant Array of Independent Disks (RAID) configuration;

instructing the selected SSD to enter a garbage collection setup phase;

instructing the selected SSD to execute garbage collection;

waiting for a first interval of time; and instructing the selected SSD to stop erase operations.

Statement 18. An embodiment of the inventive concept includes a method according to statement 17, wherein up to a RAID failure number of SSDs of the plurality of SSDs in the RAID configuration are executing garbage collection at any time.

Statement 19. An embodiment of the inventive concept includes a method according to statement 17, wherein:

instructing the selected SSD to execute garbage collection includes directing read requests to another SSD in the RAID configuration; and the method further comprises:

waiting for a second interval of time; and scheduling the selected SSD for read requests.

Statement 20. An embodiment of the inventive concept includes a method according to statement 19, wherein directing read requests to another SSD includes directing a read request requesting a datum to a subset of other SSDs in the RAID configuration.

Statement 21. An embodiment of the inventive concept includes a method according to statement 20, wherein directing a read request requesting a datum to a subset of other SSDs includes directing the read request requesting a datum to a second SSD in the RAID configuration that stores the datum.

Statement 22. An embodiment of the inventive concept includes a method according to statement 20, wherein directing a read request requesting a datum to a subset of other SSDs includes directing a read request requesting a datum to all other SSDs in the RAID configuration.

Statement 23. An embodiment of the inventive concept includes a method according to statement 20, wherein directing a read request requesting a datum to a subset of other SSDs further includes determining the requested datum from a plurality of data stored on the subset of other SSDs in the RAID configuration.

Statement 24. An embodiment of the inventive concept includes a method according to statement 17, wherein:
selecting an SSD for garbage collection includes selecting a plurality of SSDs for garbage collection based on the plurality of free sector sizes;
instructing the selected SSD to enter a garbage collection setup phase includes instructing the selected plurality of SSDs to enter a garbage collection setup phase; and
instructing the selected SSD to execute garbage collection includes selecting a first of the selected plurality of SSDs for a garbage collection execution phase.

Statement 25. An embodiment of the inventive concept includes a method according to statement 24, further comprising:
selecting a second of the selected plurality of SSDs for a garbage collection execution phase after the selected first of the plurality of SSDs completed the garbage collection execution phase; and
instructing the selected second of the plurality of SSD to execute garbage collection.

Statement 26. An embodiment of the inventive concept includes a method according to statement 17, wherein instructing the selected SSD to enter a garbage collection setup phase includes:
instructing the selected SSD to identify a block to be erased; and
instructing the selected SSD to relocate any valid pages from the identified block.

Statement 27. An embodiment of the inventive concept includes a method according to statement 26, wherein instructing the selected SSD to enter a garbage collection setup phase includes permitting the selected SSD to process read requests while the selected SSD is in the garbage collection setup phase.

Statement 28. An embodiment of the inventive concept includes a method according to statement 17, further comprising configuring each of the plurality of SSDs in the RAID configuration so that the SSDs in the RAID configuration perform garbage collection only upon instruction from a RAID controller.

Statement 29. An embodiment of the inventive concept includes a method according to statement 17, wherein instructing the selected SSD to execute garbage collection includes instructing the selected SSD to execute garbage collection on at least one erase zone, where the at least one erase zone includes a plurality of blocks.

Statement 30. An embodiment of the inventive concept includes a method according to statement 17, wherein selecting an SSD for garbage collection includes selecting the SSD with a lowest free sector size.

Statement 31. An embodiment of the inventive concept includes a method according to statement 30, wherein selecting the SSD with a lowest free sector size includes selecting the SSD with the lowest free sector size relative to a capacity of the SSD.

Statement 32. An embodiment of the inventive concept includes a method according to statement 17, wherein selecting an SSD for garbage collection includes selecting the SSD requiring static wear leveling.

Statement 33. An embodiment of the inventive concept includes a method according to statement 17, wherein:
waiting for a first interval of time includes buffering write requests while the selected SSD is executing garbage collection; and the method further comprises delivering the buffered write requests to the selected SSD after instructing the selected SSD to end erase operations.

Statement 34. An embodiment of the inventive concept includes a method according to statement 17, wherein waiting for a first interval of time includes delivering write requests while the selected SSD is executing garbage collection to a buffer in the selected SSD,
wherein the selected SSD can process the buffered write requests after the selected SSD ends erase operations.

Statement 35. An embodiment of the inventive concept includes a method according to statement 17, wherein selecting a Solid State Drive (SSD) for garbage collection includes querying each of the plurality of SSDs for the plurality of free sector sizes.

Statement 36. An embodiment of the inventive concept includes a method according to statement 17, wherein selecting a Solid State Drive (SSD) for garbage collection includes receiving the plurality of free sector sizes from the plurality of SSDs.

Statement 37. An embodiment of the inventive concept includes a method according to statement 17, wherein selecting a Solid State Drive (SSD) for garbage collection based on a plurality of free sector sizes for a plurality of SSDs includes selecting up to a RAID failure number of SSDs for garbage collection based on a plurality of free sector sizes for a plurality of SSDs Statement 38. An embodiment of the inventive concept includes an article, comprising a tangible storage medium, the tangible storage medium having stored thereon non-transitory instructions that, when executed by a machine, result in:
selecting a Solid State Drive (SSD) for garbage collection based on a plurality of free sector sizes for a plurality of SSDs in a Redundant Array of Independent Disks (RAID) configuration;
instructing the selected SSD to enter a garbage collection setup phase;
instructing the selected SSD to execute garbage collection;
waiting for a first interval of time; and
instructing the selected SSD to stop erase operations.

Statement 39. An embodiment of the inventive concept includes an article according to statement 38, wherein up to a RAID failure number of SSDs of the plurality of SSDs in the RAID configuration are executing garbage collection at any time.

Statement 40. An embodiment of the inventive concept includes an article according to statement 38, wherein:
instructing the selected SSD to execute garbage collection includes directing read requests to another SSD in the RAID configuration; and
the tangible storage medium has stored thereon further non-transitory instructions that, when executed by the machine, result in:
waiting for a second interval of time; and
scheduling the selected SSD for read requests.

Statement 41. An embodiment of the inventive concept includes an article according to statement 40, wherein directing read requests to another SSD includes directing a read request requesting a datum to a subset of other SSDs in the RAID configuration.

Statement 42. An embodiment of the inventive concept includes an article according to statement 41, wherein directing a read request requesting a datum to a subset of other SSDs includes directing the read request requesting a datum to a second SSD in the RAID configuration that stores the datum.

Statement 43. An embodiment of the inventive concept includes an article according to statement 41, wherein directing a read request requesting a datum to a subset of other SSDs includes directing a read request requesting a datum to all other SSDs in the RAID configuration.

Statement 44. An embodiment of the inventive concept includes an article according to statement 41, wherein directing a read request requesting a datum to a subset of other SSDs further includes determining the requested datum from a plurality of data stored on the subset of other SSDs in the RAID configuration.

Statement 45. An embodiment of the inventive concept includes an article according to statement 38, wherein:
selecting an SSD for garbage collection includes selecting a plurality of SSDs for garbage collection based on the plurality of free sector sizes;
instructing the selected SSD to enter a garbage collection setup phase includes instructing the selected plurality of SSDs to enter a garbage collection setup phase; and
instructing the selected SSD to execute garbage collection includes selecting a first of the selected plurality of SSDs for a garbage collection execution phase.

Statement 46. An embodiment of the inventive concept includes an article according to statement 45, the tangible storage medium has stored thereon further non-transitory instructions that, when executed by the machine, result in:
selecting a second of the selected plurality of SSDs for a garbage collection execution phase after the selected first of the plurality of SSDs completed the garbage collection execution phase; and
instructing the selected second of the plurality of SSD to execute garbage collection.

Statement 47. An embodiment of the inventive concept includes an article according to statement 38, wherein instructing the selected SSD to enter a garbage collection setup phase includes:
instructing the selected SSD to identify a block to be erased; and
instructing the selected SSD to relocate any valid pages from the identified block.

Statement 48. An embodiment of the inventive concept includes an article according to statement 47, wherein instructing the selected SSD to enter a garbage collection setup phase includes permitting the selected SSD to process read requests while the selected SSD is in the garbage collection setup phase.

Statement 49. An embodiment of the inventive concept includes an article according to statement 38, the tangible storage medium has stored thereon further non-transitory instructions that, when executed by the machine, result in configuring each of the plurality of SSDs in the RAID configuration so that the SSDs in the RAID configuration perform garbage collection only upon instruction from a RAID controller.

Statement 50. An embodiment of the inventive concept includes an article according to statement 38, wherein instructing the selected SSD to execute garbage collection includes instructing the selected SSD to execute garbage collection on at least one erase zone, where the at least one erase zone includes a plurality of blocks.

Statement 51. An embodiment of the inventive concept includes an article according to statement 38, wherein selecting an SSD for garbage collection includes selecting the SSD with a lowest free sector size.

Statement 52. An embodiment of the inventive concept includes an article according to statement 51, wherein selecting the SSD with a lowest free sector size includes selecting the SSD with the lowest free sector size relative to a capacity of the SSD.

Statement 53. An embodiment of the inventive concept includes an article according to statement 38, wherein selecting an SSD for garbage collection includes selecting the SSD requiring static wear leveling.

Statement 54. An embodiment of the inventive concept includes an article according to statement 38, wherein:
waiting for a first interval of time includes buffering write requests while the selected SSD is executing garbage collection; and
the tangible storage medium has stored thereon further non-transitory instructions that, when executed by the machine, result in delivering the buffered write requests to the selected SSD after instructing the selected SSD to end erase operations.

Statement 55. An embodiment of the inventive concept includes an article according to statement 38, wherein waiting for a first interval of time includes delivering write requests while the selected SSD is executing garbage collection to a buffer in the selected SSD,
wherein the selected SSD can process the buffered write requests after the selected SSD ends erase operations.

Statement 56. An embodiment of the inventive concept includes an article according to statement 38, wherein selecting a Solid State Drive (SSD) for garbage collection includes querying each of the plurality of SSDs for the plurality of free sector sizes.

Statement 57. An embodiment of the inventive concept includes an article according to statement 38, wherein selecting a Solid State Drive (SSD) for garbage collection includes receiving the plurality of free sector sizes from the plurality of SSDs.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:
1. A controller, comprising:
control logic to control read and write requests for a plurality of Solid State Drives (SSDs), wherein the plurality of SSDs stores a data and an erasure coding, such that using the data and the erasure coding the data can be recovered from fewer than all of the plurality of SSDs;
selection logic to select an SSD from the plurality of SSDs for garbage collection based on a plurality of free sector sizes for the plurality of SSDs;
setup logic to instruct the selected SSD to enter a garbage collection setup phase, wherein the selected SSD may copy valid data from a first block scheduled for erase operations to a second block;
execute logic to instruct the selected SSD to enter a garbage collection execute phase, wherein the selected SSD may erase the first block scheduled for erase operations; and
a timer to measure how long the selected SSD remains be in the garbage collection setup phase before entering the garbage collection execute phase, wherein the selected SSD remains in the garbage collection setup phase until instructed to enter the garbage collection execute phase, wherein the SSD exits the garbage collection setup phase when the SSD enters the garbage collection execute phase, and wherein the selected SSD may receive read requests and write requests originating at a server during the garbage collection setup phase.

2. A controller according to claim 1, wherein at most one SSD of the plurality of the SSDs is in the garbage collection execute phase at any one time.

3. A controller according to claim 1, wherein:
more than a predefined number of SSDs of the plurality of the SSDs may be in the garbage collection setup phase at any one time; and
up to the predefined number of SSDs of the plurality of the SSDs are in the garbage collection execute phase at the any one time,
wherein the predefined number of SSDs represents a maximum number of SSDs that can be removed from the plurality of SSDs and still reconstruct the data from the data and the erasure coding from remaining SSDs in the plurality of SSDs.

4. A controller according to claim 1, wherein the setup logic is operative to instruct a subset of the plurality of SSDs to enter the garbage collection setup phase.

5. A controller according to claim 1, further comprising configuration logic to configure each of the SSDs to only perform the garbage collection execute phase upon instruction from the controller.

6. A controller according to claim 1, wherein the execute logic is operative to instruct the selected SSD to end the garbage collection execute phase.

7. A controller according to claim 6, wherein the controller includes a buffer to store write requests directed to the selected SSD until after the execute logic has instructed the selected SSD to end the garbage collection execute phase.

8. A controller according to claim 1, wherein the controller is operative to send read requests intended for the selected SSD to a subset of all other SSDs when the selected SSD is in the garbage collection execute phase.

9. A controller according to claim 1, wherein the selection logic includes receive logic to receive the plurality of free sector sizes from the plurality of SSDs.

10. A controller according to claim 9, wherein the selection logic further includes query logic to query the plurality of SSDs for the plurality of free sector sizes.

11. A method, comprising:
selecting a Solid State Drive (SSD) for garbage collection based on a plurality of free sector sizes for a plurality of SSDs, wherein the plurality of SSDs stores a data and an erasure coding, such that using the data and the erasure coding the data can be recovered from fewer than all of the plurality of SSDs;
instructing the selected SSD to enter a garbage collection setup phase, wherein the selected SSD may copy valid data from a first block scheduled for erase operations to a second block;
waiting for a first interval of time before instructing the selected SSD to execute garbage collection;
instructing the selected SSD to execute garbage collection, wherein the selected SSD may erase the first block scheduled for erase operations;
waiting for a second interval of time; and
instructing the selected SSD to stop erase operations, wherein the selected SSD remains in the garbage collection setup phase until instructed to enter the garbage collection execute phase, wherein the SSD exits the garbage collection setup phase when the SSD enters the garbage collection execute phase, and wherein the selected SSD may receive read requests and write requests originating at a server during the garbage collection setup phase.

12. A method according to claim 11, wherein:
instructing the selected SSD to execute garbage collection includes directing read requests to another SSD of the plurality of SSDs; and
the method further comprises:
waiting for a third interval of time; and
scheduling the selected SSD for read requests.

13. A method according to claim 11, wherein:
selecting an SSD for garbage collection includes selecting a plurality of SSDs for garbage collection based on the plurality of free sector sizes;
instructing the selected SSD to enter a garbage collection setup phase includes instructing the selected plurality of SSDs to enter a garbage collection setup phase; and
instructing the selected SSD to execute garbage collection includes selecting a first of the selected plurality of SSDs for a garbage collection execution phase.

14. A method according to claim 13, further comprising:
selecting a second of the selected plurality of SSDs for a garbage collection execution phase after the selected first of the plurality of SSDs completed the garbage collection execution phase; and
instructing the selected second of the plurality of SSD to execute garbage collection.

15. A method according to claim 11, wherein selecting an SSD for garbage collection includes selecting the SSD requiring static wear leveling.

16. A method according to claim 11, wherein:
waiting for a second interval of time includes buffering write requests while the selected SSD is executing garbage collection; and
the method further comprises delivering the buffered write requests to the selected SSD after instructing the selected SSD to end erase operations.

17. A method according to claim 11, wherein selecting a Solid State Drive (SSD) for garbage collection includes receiving the plurality of free sector sizes from the plurality of SSDs.

18. A method according to claim 11, wherein selecting a Solid State Drive (SSD) for garbage collection based on a plurality of free sector sizes for a plurality of SSDs includes selecting up to a predefined number of SSDs for garbage collection based on a plurality of free sector sizes for a plurality of SSDs, wherein the predefined number of SSDs represents a maximum number of SSDs that can be removed from the plurality of SSDs and still reconstruct the data from the data and the erasure coding from remaining SSDs in the plurality of SSDs.

19. An article, comprising a tangible storage medium, the tangible storage medium having stored thereon non-transitory instructions that, when executed by a machine, result in:
selecting a Solid State Drive (SSD) for garbage collection based on a plurality of free sector sizes for a plurality of SSDs, wherein the plurality of SSDs stores a data and an erasure coding, such that using the data and the erasure coding the data can be recovered from fewer than all of the plurality of SSDs;

instructing the selected SSD to enter a garbage collection setup phase, wherein the selected SSD may copy valid data from a first block scheduled for erase operations to a second block;

waiting for a first interval of time before instructing the selected SSD to execute garbage collection;

instructing the selected SSD to execute garbage collection, wherein the selected SSD may erase the first block scheduled for erase operations;

waiting for a second interval of time; and instructing the selected SSD to stop erase operations, wherein the selected SSD remains in the garbage collection setup phase until instructed to enter the garbage collection execute phase, wherein the SSD exits the garbage collection setup phase when the SSD enters the garbage collection execute phase, and wherein the selected SSD may receive read requests and write requests originating at a server during the garbage collection setup phase.

20. An article according to claim 19, wherein up to a predefined number of SSDs of the plurality of SSDs are executing garbage collection at any time, the predefined number of SSDs represents a maximum number of SSDs that can be removed from the plurality of SSDs and still reconstruct the data from the data and the erasure coding from remaining SSDs in the plurality of SSDs.

21. A controller according to claim 1, wherein: during the garbage collection setup phase, the selected SSD does not erase the first block; and during the garbage collection execute phase, the selected SSD does not copy valid data from the first block to the second block.

22. A controller according to claim 1, wherein the selected SSD may receive second write requests originating at a server during the garbage collection execute phase, store the second write requests in a buffer, and process the second write requests in the buffer after the garbage collection execute phase completes.

23. A controller according to claim 1, wherein the selected SSD may copy valid data from a first block scheduled for erase operations to a second block at any time while the selected SSD is in the garbage collection setup phase.

* * * * *